(12) United States Patent
Narikawa

(10) Patent No.: US 11,244,467 B2
(45) Date of Patent: Feb. 8, 2022

(54) INFORMATION PROCESSING APPARATUS, INFORMATION PROCESSING METHOD, AND RECORDING MEDIUM

(71) Applicant: SONY CORPORATION, Tokyo (JP)

(72) Inventor: Natsuko Narikawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 48 days.

(21) Appl. No.: 16/332,989

(22) PCT Filed: Sep. 25, 2017

(86) PCT No.: PCT/JP2017/034568
§ 371 (c)(1),
(2) Date: Mar. 13, 2019

(87) PCT Pub. No.: WO2018/083910
PCT Pub. Date: May 11, 2018

(65) Prior Publication Data
US 2019/0279391 A1   Sep. 12, 2019

(30) Foreign Application Priority Data
Nov. 7, 2016 (JP) ............... JP2016-216908

(51) Int. Cl.
*G06T 7/70* (2017.01)
*G06T 7/50* (2017.01)
*G06F 16/50* (2019.01)

(52) U.S. Cl.
CPC ............ *G06T 7/70* (2017.01); *G06F 16/50* (2019.01); *G06T 7/50* (2017.01);
(Continued)

(58) Field of Classification Search
CPC ............................ G06T 7/596; H04N 13/243
See application file for complete search history.

(56) References Cited

U.S. PATENT DOCUMENTS

2011/0210915 A1* 9/2011 Shotton ............. G06K 9/00369
345/157
2016/0261844 A1* 9/2016 Kadambi ............... G01B 11/24

FOREIGN PATENT DOCUMENTS

JP    2006-343859 A    12/2006
JP    2012-123667 A    6/2012
(Continued)

OTHER PUBLICATIONS

Jain, Arjun, et al. "Learning human pose estimation features with convolutional networks." arXiv preprint arXiv: 1312.7302 (2013). (Year: 2013).*

(Continued)

*Primary Examiner* — Vincent Rudolph
*Assistant Examiner* — Raphael Schwartz
(74) *Attorney, Agent, or Firm* — Paratus Law Group, PLLC

(57) ABSTRACT

There is provided an information processing apparatus, an information processing method, and a recording medium that can estimate a three-dimensional position of a targeted point more accurately. The information processing apparatus includes: a targeted point estimation unit configured to identify probability maps indicating existence probabilities of a targeted point in a plurality of projection directions, on the basis of an input image; and a synthesis unit configured to identify a three-dimensional position of the targeted point on the basis of the probability maps in the plurality of projection directions.

11 Claims, 15 Drawing Sheets

(52) U.S. Cl.
CPC ............... *G06T 2207/10028* (2013.01); *G06T 2207/20076* (2013.01); *G06T 2207/20081* (2013.01)

(56) References Cited

FOREIGN PATENT DOCUMENTS

| | | |
|---|---|---|
| JP | 2012-256098 A | 12/2012 |
| JP | 2015-115041 A | 6/2015 |

OTHER PUBLICATIONS

Xie, Junyuan, Ross Girshick, and Ali Farhadi. "Deep3d: Fully automatic 2d-to-3d video conversion with deep convolutional neural networks." European conference on computer vision. Springer, Cham, 2016. (Year: 2016).*

Tompson et al., Real-Time Continuous Pose Recovery of Human Hands Using Convolutional Networks, ACM Transactions on Graphics (TOG), Aug. 2014, pp. 1-10, vol. 33, Issue 5, Article No. 169.

* cited by examiner

FIG. 10
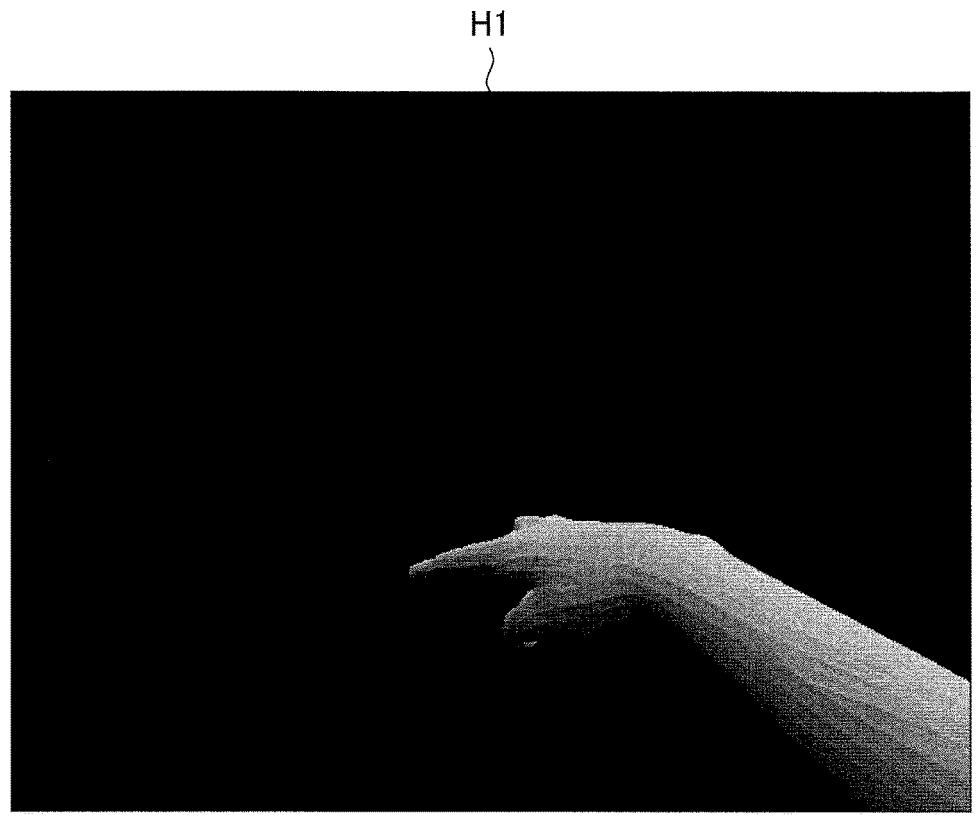
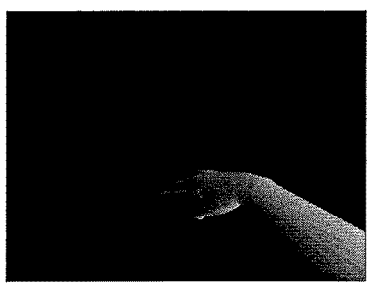
x DIRECTION
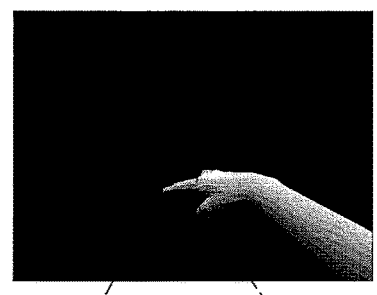
y DIRECTION
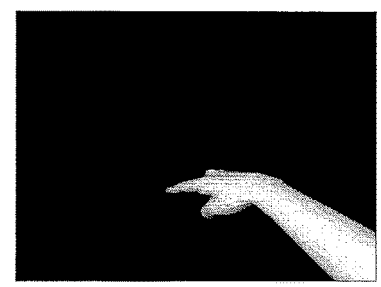
z DIRECTION
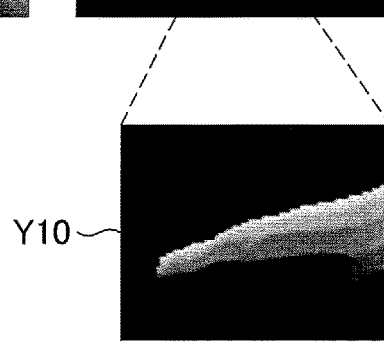

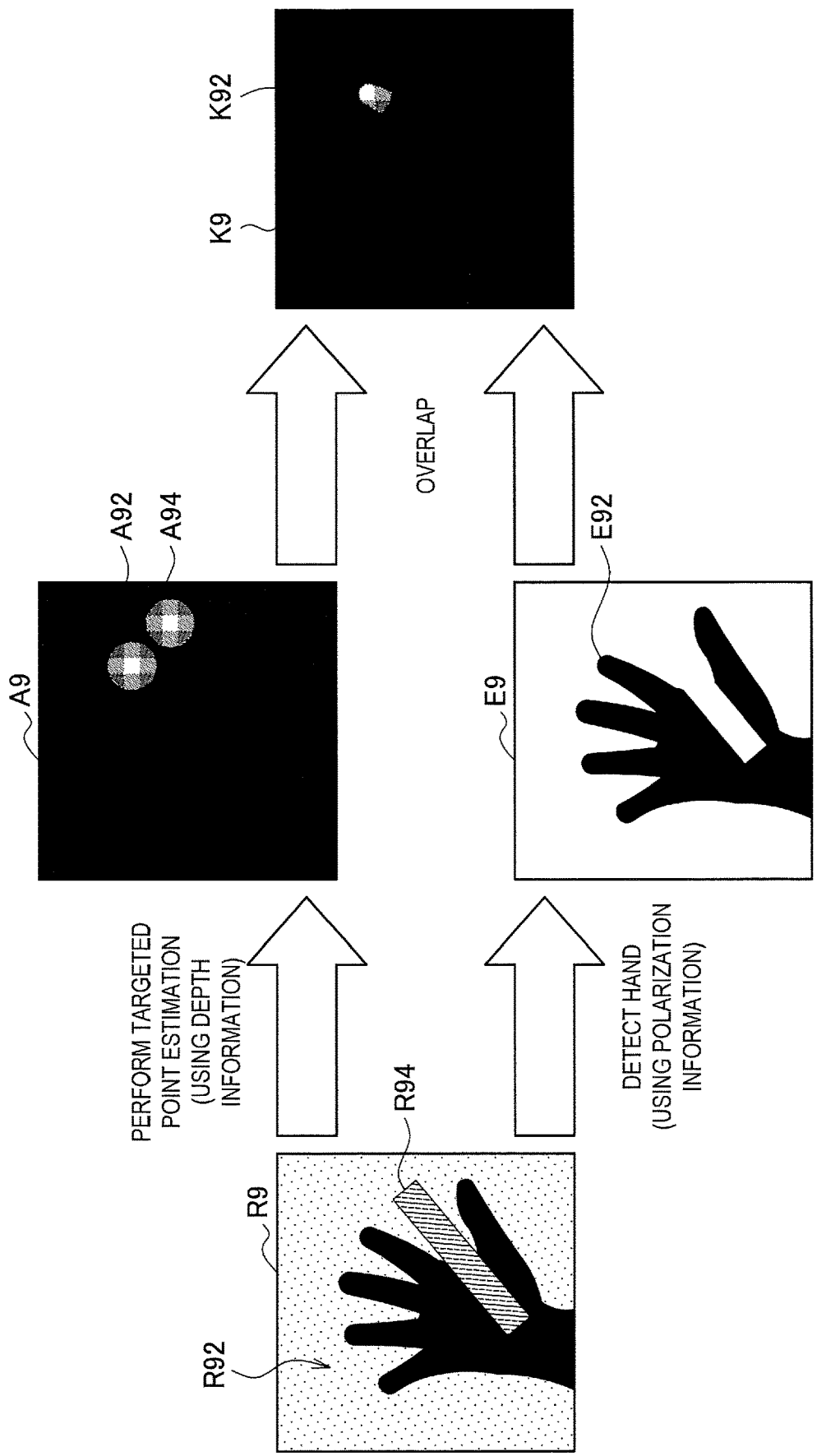

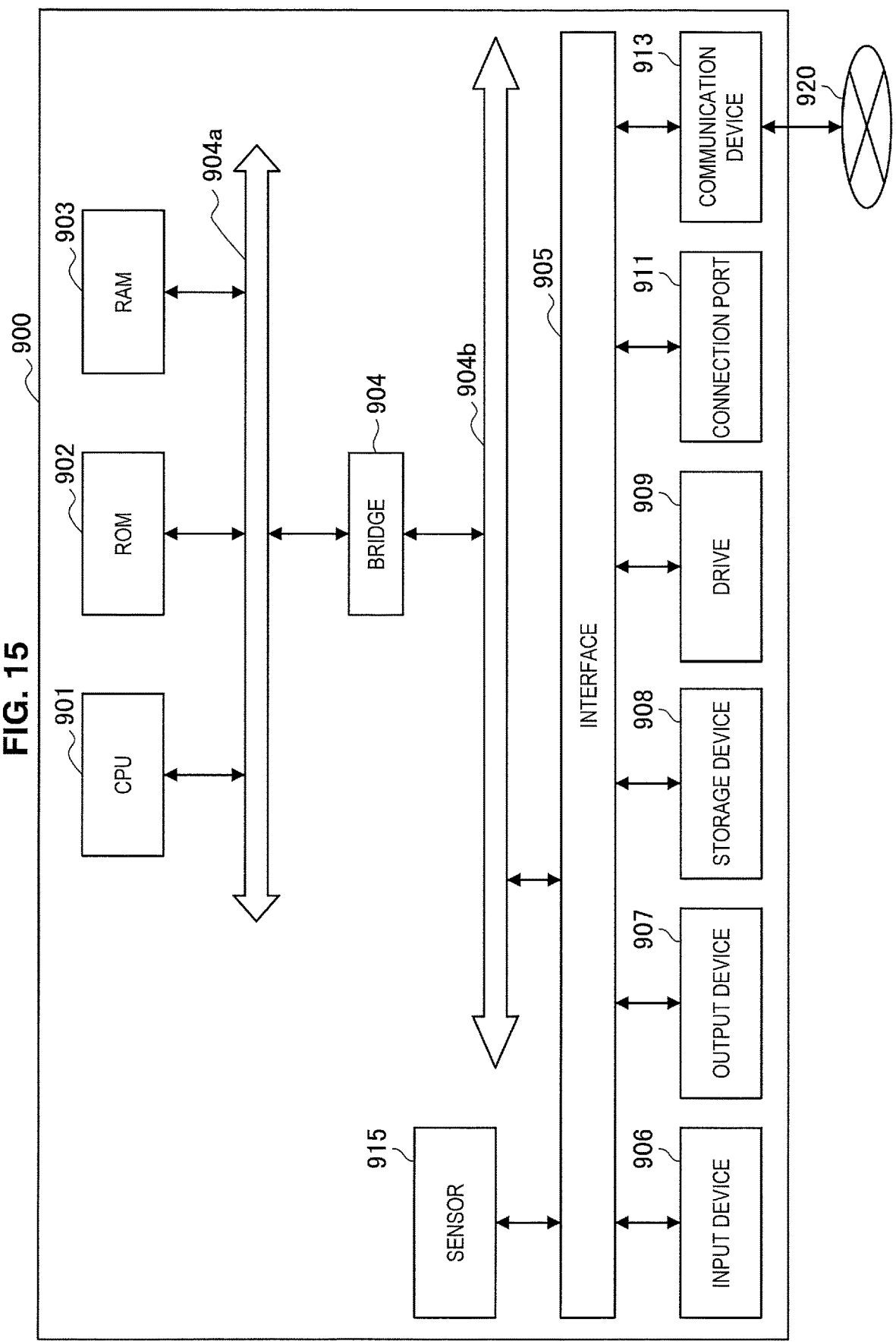

INFORMATION PROCESSING APPARATUS, INFORMATION PROCESSING METHOD, AND RECORDING MEDIUM

CROSS REFERENCE TO PRIOR APPLICATION

This application is a National Stage Patent Application of PCT International Patent Application No. PCT/JP2017/034568 (filed on Sep. 25, 2017) under 35 U.S.C. § 371, which claims priority to Japanese Patent Application No. 2016-216908 (filed on Nov. 7, 2016), which are all hereby incorporated by reference in their entirety.

TECHNICAL FIELD

The present disclosure relates to an information processing apparatus, an information processing method, and a recording medium.

BACKGROUND ART

The recognition of the shape of an object included (appearing) in an image is performed on the basis of the image. For example, Patent Literature 1 discloses a technology of performing the recognition of a hand shape from an image, and Patent Literature 2 discloses a technology of recognizing a surface shape of a subject on the basis of polarization images in a plurality of polarization directions, and performing image processing that is based on the surface shape of the subject.

On the other hand, a three-dimensional position of a targeted point related to an object is estimated on the basis of an image. For example, Non-Patent Literature 1 discloses a technology of estimating a two-dimensional position of a targeted point on a plane of an input image using a depth image as an input image, and estimating a three-dimensional position of a targeted point related to a hand such as a joint point or a fingertip, by acquiring a depth value of the two-dimensional position.

CITATION LIST

Patent Literature

Patent Literature 1: JP 2012-256098A
Patent Literature 2: JP 2015-115041A

Non-Patent Literature

Non-Patent Literature 1: Jonathan Tompson and three others, "Real-Time Continuous Pose Recovery of Human Hands Using Convolutional Networks", ACM Transactions on Graphics (TOG) Volume 33 Issue 5, August 2014 Article No. 169

DISCLOSURE OF INVENTION

Technical Problem

Nevertheless, in the above-described technologies, it has been sometimes difficult to accurately estimate a targeted point position. For example, in a depth image, in a case where a targeted point is hidden, or in a case where the accuracy of a depth value is low, there is a possibility that an erroneous three-dimensional position is identified as a targeted point position, and the estimation accuracy of the targeted point position deteriorates.

In view of the foregoing, the present disclosure proposes an information processing apparatus, an information processing method, and a recording medium that are novel and improved, and can estimate a three-dimensional position of a targeted point more accurately.

Solution to Problem

According to the present disclosure, there is provided an information processing apparatus including: a targeted point estimation unit configured to identify probability maps indicating existence probabilities of a targeted point in a plurality of projection directions, on the basis of an input image; and a synthesis unit configured to identify a three-dimensional position of the targeted point on the basis of the probability maps in the plurality of projection directions.

Moreover, according to the present disclosure, there is provided an information processing method including: identifying probability maps indicating existence probabilities of a targeted point in a plurality of projection directions, on the basis of an input image; and identifying, by a processor, a three-dimensional position of the targeted point on the basis of the probability maps in the plurality of projection directions.

Moreover, according to the present disclosure, there is provided a computer-readable recording medium having a program recorded therein, the program causing a computer to execute: a function of identifying probability maps indicating existence probabilities of a targeted point in a plurality of projection directions, on the basis of an input image; and a function of identifying a three-dimensional position of the targeted point on the basis of the probability maps in the plurality of projection directions.

Advantageous Effects of Invention

As described above, according to the present disclosure, a three-dimensional position of a targeted point can be estimated more accurately.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 10 is an explanatory diagram for describing a normal line image.

FIG. 14 is an explanatory diagram illustrating an example of targeted point estimation processing performed in a case where an input image includes a depth image and a polarization image.

FIG. 15 is an explanatory diagram illustrating a hardware configuration example.

MODE(S) FOR CARRYING OUT THE INVENTION

Figure 1:
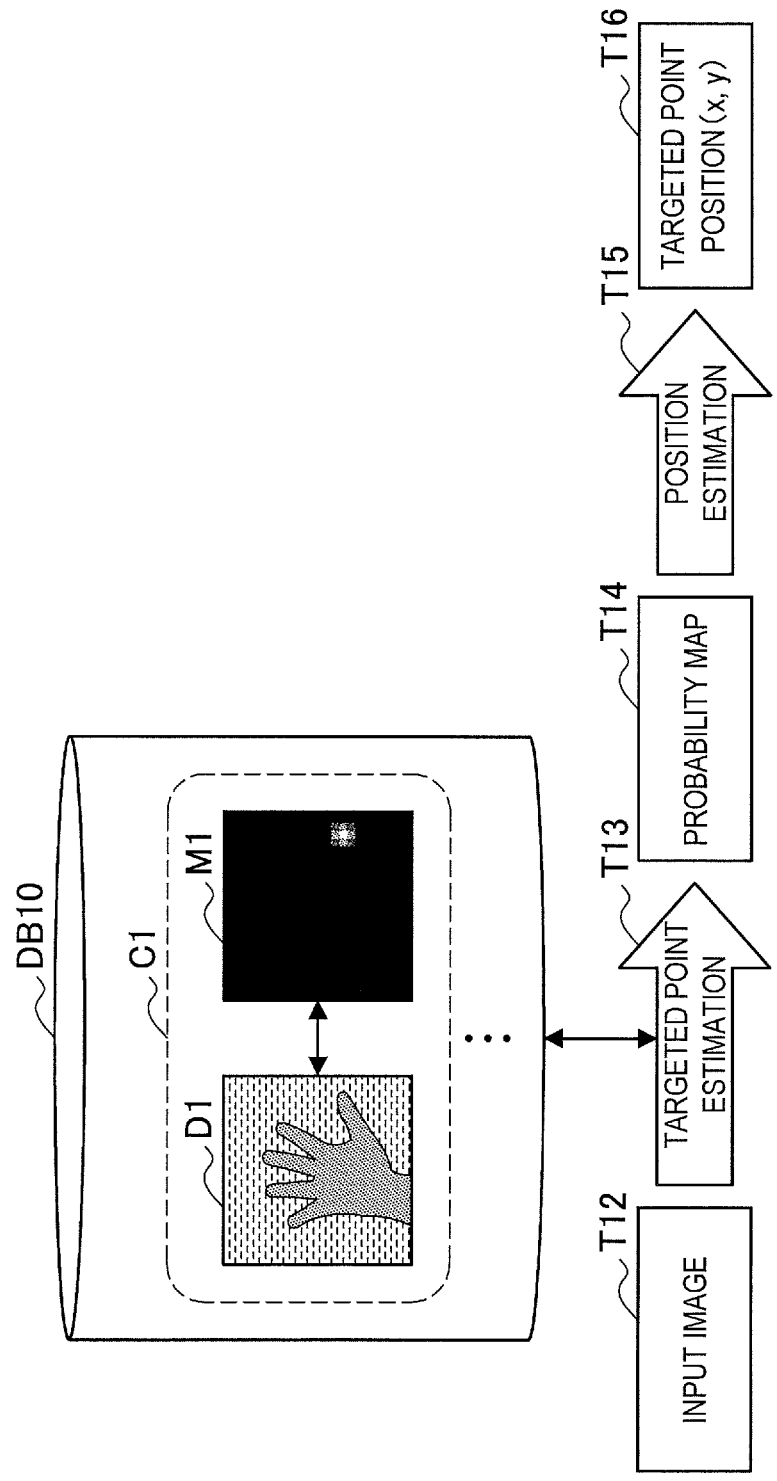
FIG. 1 is an explanatory diagram illustrating an example of processing of identifying a targeted point position of a hand (an example of an object) from an image.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

Note that the description will be given in the following order.

<<1. Background>>
<<2. Overview>>
<<3. Configuration>>
<3-1. Overall configuration>
<3-2. Details of control unit>
<<4. Operation>>
<<5. Modified examples>>
<5-1. Modified Example 1>
<5-2. Modified Example 2>
<5-3. Modified Example 3>
<5-4. Modified Example 4>
<<6. Hardware configuration example>>
<<7. Conclusion>>

1. BACKGROUND

Before an information processing apparatus according to an embodiment of the present disclosure will be described, first of all, background of devisal of an information processing apparatus according to an embodiment of the present disclosure will be described.

A position of a targeted point related to an object included in an input image is acquired on the basis of the input image. In this specification, the targeted point related to an object may be a point included in common in objects of the same kind, for example. For example, the targeted point may be a fingertip or a joint point in a hand (an example of an object), may be an eye, a nose, or a mouth in a face (an example of an object), may be an end point or a joint point in a human body (an example of an object), or may be a tire or a light in an automobile (an example of an object).

The targeted point position of the hand is considered to be applied to a user interface (UI) that is based on a shape of the hand and the targeted point position, intention understanding of a user, or the like, for example. In addition, the targeted point position of the human body is considered to be applied to a UI that is based on a shape of the human body and the targeted point position, a game manipulation, or the like, for example. In addition, the targeted point position of the automobile is considered to be applied to processing of sterically recognizing a situation of another automobile, or the like in driving assist or an automated driving function.

FIG. 1 is an explanatory diagram illustrating an example of processing of identifying a targeted point position of a hand (an example of an object) from an image. In the example illustrated in FIG. 1, a probability map T14 indicating an existence probability of a targeted point is obtained by targeted point estimation processing T13 that is based on an input image T12. For example, the targeted point estimation processing T13 may be processing of searching a correspondence information database DB 10 for an image similar to the input image T12, and acquiring a probability map corresponding to an image obtained by the searching, as the probability map T14. Note that, in the example illustrated in FIG. 1, as a luminance value in the probability map T14 becomes larger, a probability at which the targeted point exists at the position in the input image T12 that corresponds to a position indicating the luminance value is larger.

As illustrated in FIG. 1, the correspondence information database DB 10 stores correspondence information C1 including an image D1 and a probability map M1 associated with the image D1. The generation method of the probability map M1 is not limited, and the probability map M1 may be manually generated in advance, for example. Note that, although FIG. 1 illustrates only the correspondence information C1 as an example of correspondence information stored in the correspondence information database DB 10, the correspondence information database DB 10 can store a plurality of pieces of correspondence information, and the accuracy of the targeted point estimation processing T13 can be enhanced in accordance with the number of pieces of correspondence information stored in the correspondence information database DB 10.

A targeted point position T16 is identified (estimated) by position estimation processing T15 that is based on the probability map T14 obtained by the targeted point estimation processing T13. For example, the position estimation processing T15 may be processing of estimating, as the targeted point position T16, a position in the probability map T14 at which a value (an existence probability of the targeted point) is the largest. As illustrated in FIG. 1, the targeted point position T16 to be identified may be a two-dimensional position (x, y) in the input image T12.

Depending on the application destination of a targeted point position, a case where it is desirable to acquire a three-dimensional position of a targeted point rather than a two-dimensional position of the targeted point is considered. Here, for example, in a case where the input image T12 is a depth image (distance image) including depth information, by referring to a depth value z at a position (x, y), a three-dimensional position (x, y, z) can be identified as the targeted point position T16. Nevertheless, in the depth image, in a case where a targeted point is hidden, or in a case where the accuracy of a depth value is low, there is a possibility that an erroneous three-dimensional position is identified as a targeted point position, and the estimation accuracy of the targeted point position deteriorates.

Thus, from a viewpoint of the above-described circumstances, an embodiment of the present disclosure has been eventually devised. According to the present embodiment, by estimating probability maps in a plurality of projection directions and identifying a three-dimensional position of a targeted point on the basis of the probability maps in the plurality of directions, it is possible to accurately estimate a three-dimensional position of the targeted point. Hereinafter, an overview of an embodiment of the present disclosure that has such an effect will be described with reference to FIGS. 2 and 3.

2. OVERVIEW

Hereinafter, an overview of an embodiment of the present disclosure will be described, and a detailed configuration of an information processing apparatus according to the present embodiment will be described later with reference to FIG. 4 and the like. Note that, hereinafter, an example of identifying a targeted point position of a hand from an image will be described, but an object according to the present embodiment is not limited to the hand.

Figure 2:
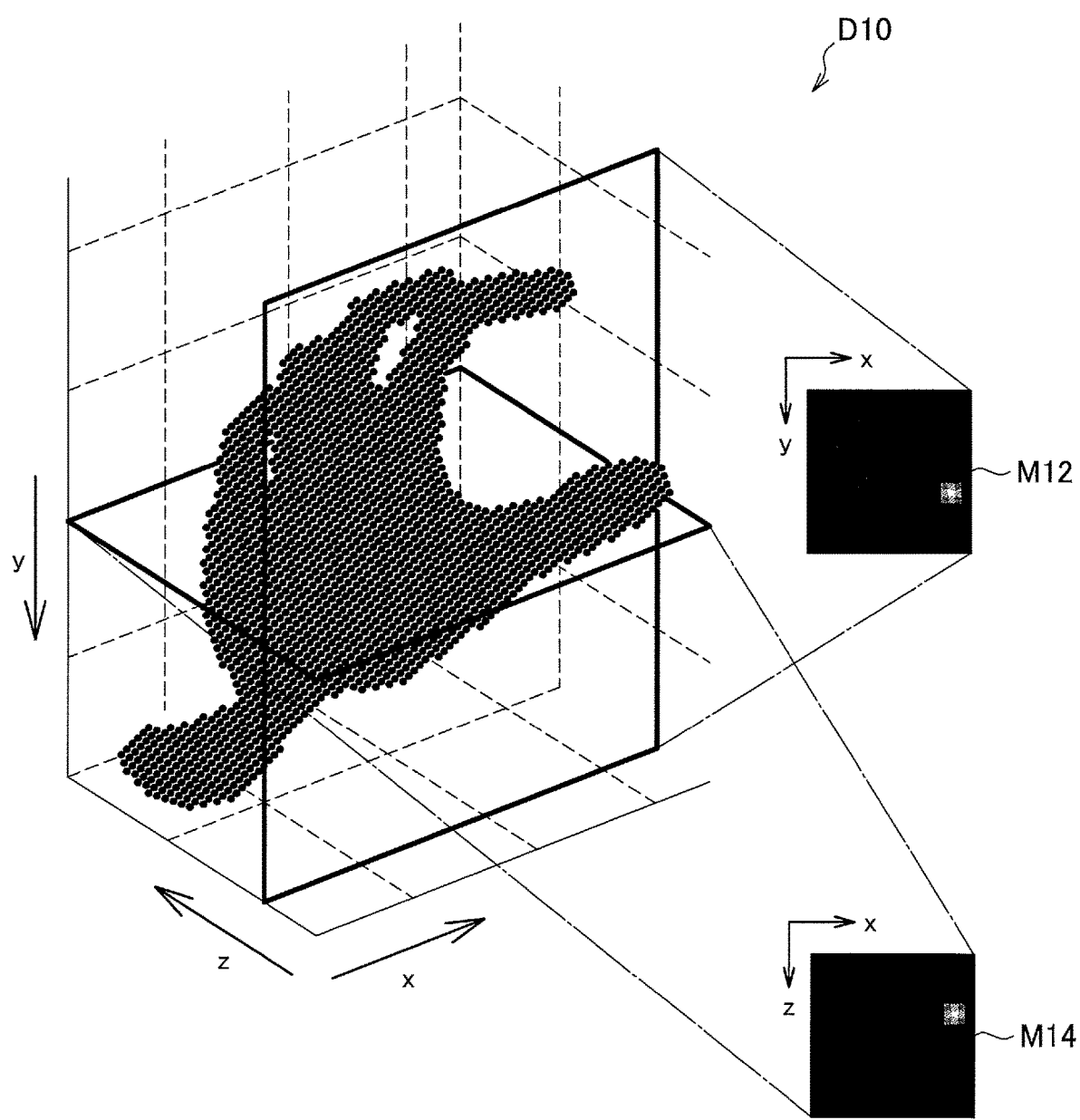
FIG. 2 is an explanatory diagram for describing probability maps in a plurality of projection directions.

Unlike the example illustrated in FIG. 1, the information processing apparatus according to the present embodiment estimates probability maps in a plurality of (at least two or more) projection directions. FIG. 2 is an explanatory diagram for describing probability maps in a plurality of projection directions.

In the example illustrated in FIG. 2, a depth image D10 is a depth image obtained by sensing (imaging) a hand. Because the depth image D10 includes information regarding a z direction being a depth direction (deepness direction) in addition to information regarding an x direction and a y direction, as illustrated in FIG. 2, for example, the depth image D10 can be represented as a point group (an aggregate of points) in a three-dimensional space.

For example, when a targeted point in the depth image D10 represented as a point group is projected in the z direction (first projection direction), for example, the targeted point can be represented as a point on an x-y plane, and when the targeted point is projected in the y direction (second projection direction), the targeted point can be represented as a point on an x-z plane. Conversely, as illustrated in FIG. 2, it is possible to identify a three-dimensional position on the basis of a probability map M12 on the x-y plane that is projected in the z direction (probability map in the z direction), and a probability map M14 on the x-z plane that is projected in the y direction (a probability map in the y direction). For example, it is possible to acquire a two-dimensional position having a maximum value, from a probability map in each projection direction, and identify a three-dimensional position of the targeted point on the basis of the two-dimensional position.

In a case where probability maps in at least two or more projection directions is obtained as described above, it is possible to identify a three-dimensional position of a targeted point without referring to a depth value, and even in a case where the accuracy of a depth value is low, a three-dimensional position of the targeted point can be accurately identified. Note that, in the example illustrated in FIG. 2, the probability maps projected in the z direction and the y direction are illustrated, but a probability map on a y-z plane that is projected in the x direction can be also considered.

Figure 3:
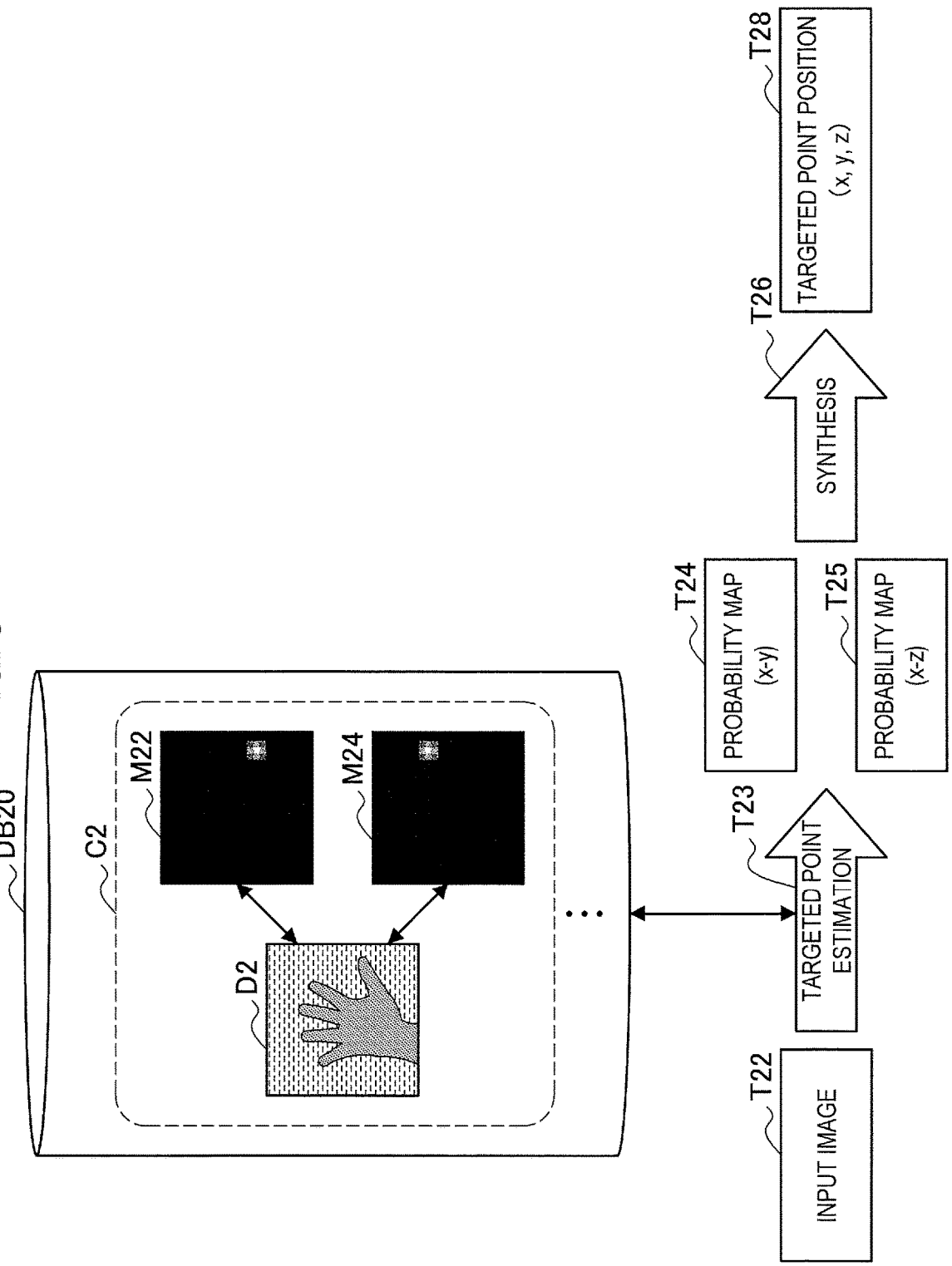
FIG. 3 is an explanatory diagram for describing an overview of an embodiment according to the present disclosure.

FIG. 3 is an explanatory diagram for describing an overview of the present embodiment. In the example illustrated in FIG. 3, probability maps T24 and T25 in two different projection directions are identified by targeted point estimation processing T23 that is based on an input image T22. The probability map T24 is a probability map on the x-y plane that is projected in the z direction, and the probability map T25 is a probability map on the x-z plane that is projected in the y direction.

For example, the targeted point estimation processing T23 may be processing of searching a correspondence information database DB 20 for an image similar to the input image T22, and acquiring, as the probability maps T24 and T25, probability maps in a plurality of projection directions that correspond to an image obtained by the searching.

As illustrated in FIG. 3, the correspondence information database DB 20 stores correspondence information C2 including an image D2, and a probability map M22 and a probability map M24 in a plurality of projection directions that are associated with the image D2. For example, the probability map M22 is a probability map in the z direction and the probability map M24 is a probability map in the y direction.

The generation method of the probability map M22 and the probability map M24 is not limited, and the probability map M22 and the probability map M24 may be manually generated in advance, for example. Note that, although FIG. 3 illustrates only the correspondence information C2 as an example of correspondence information stored in the correspondence information database DB 10, the correspondence information database DB 20 can store a plurality of pieces of correspondence information, and the accuracy of the targeted point estimation processing T23 can be enhanced in accordance with the number of pieces of correspondence information stored in the correspondence information database DB 20.

A targeted point position T28 is identified by synthesis processing T26 that is based on the probability maps T24 and T25 obtained by the targeted point estimation processing T23. For example, the synthesis processing T26 may be processing of acquiring a two-dimensional position having a maximum value, from each of the probability maps T24 and T25, and identifying a three-dimensional position (x, y, z) of the targeted point on the basis of the two-dimensional position.

Note that, hereinafter, an example in which the input image T22 and the image D2 are depth images (distance images) including depth information will be described, but the present technology is not limited to this example. According to the present embodiment, as described with reference to FIG. 2, by probability maps in a plurality of projection directions being obtained, it is possible to identify a three-dimensional position of a targeted point without referring to a depth value. Thus, the input image T22 and the image D2 are not limited to depth images, and may be RGB images (color images) acquired by a so-called RGB camera, or may be images of another type. In addition, it is desirable that the input image T22 and the image D2 are images of the same type. An example in which the input image T22 and the image D2 are images of different types will be described later as a modified example.

In addition, in the example illustrated in FIG. 3, a three-dimensional position of one targeted point is identified for one input image, but three-dimensional positions of a plurality of targeted points (tip of each finger, joint of each finger, etc.) may be identified for one input image. In addition, in this case, correspondence information to be stored in the correspondence information database DB 20 may be information in which probability maps in the number corresponding to the number of targeted points that can be output are associated with one image.

Hereinbefore, the overview of the present embodiment has been described. Subsequently, a configuration example of the information processing apparatus according to the present embodiment will be described with reference to FIGS. 4 and 5.

3. CONFIGURATION

Figure 4:
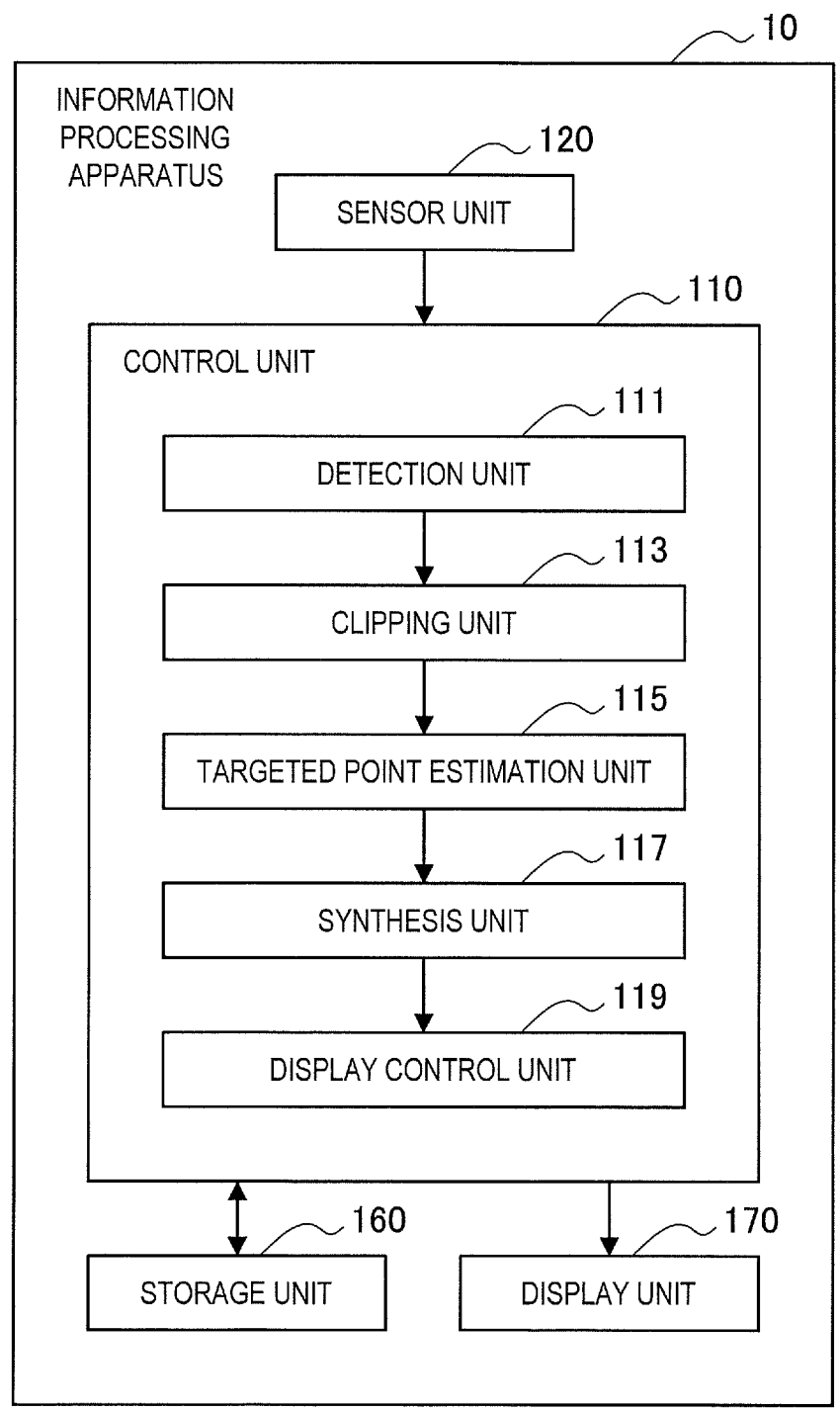
FIG. 4 is a block diagram illustrating a configuration example of an information processing apparatus according to the embodiment.

FIG. 4 is a block diagram illustrating a configuration example of the information processing apparatus according to the present embodiment. As illustrated in FIG. 4, an information processing apparatus 10 according to the present embodiment includes a control unit 110, a sensor unit 120, a storage unit 160, and a display unit 170. Hereinafter, an overall functional configuration example of the information processing apparatus 10 will be described, and then, the control unit 110 will be described in detail.

<3-1. Overall Configuration>

The control unit 110 controls each configuration of the information processing apparatus 10. For example, on the basis of a captured image acquired by the sensor unit 120, the control unit 110 identifies a three-dimensional position of a targeted point related to an object included in the captured image, and controls display of the display unit 170 on the basis of the three-dimensional position.

The sensor unit 120 acquires a captured image on the basis of sensing (imaging). The sensor unit 120 may be a stereo camera that can acquire a depth image, a time-of-flight (ToF) camera, a structured light camera, or the like, for example.

The storage unit 160 stores programs and parameters for each configuration of the information processing apparatus 10 functioning. In addition, the storage unit 160 stores the correspondence information database DB 20 storing a plurality of pieces of correspondence information each including an image, and probability maps in a plurality of projection directions that are associated with the image, which has been described with reference to FIG. 3.

The display unit 170 is a display that performs display in accordance with the control of the control unit 110. An example of a screen to be displayed by the display unit 170 will be described later with reference to FIG. 5.

<3-2. Details of Control Unit>

Hereinbefore, the overall functional configuration example of the information processing apparatus 10 according to the present embodiment has been described. Subsequently, a functional configuration of the control unit 110 illustrated in FIG. 4 will be described in more detail. As illustrated in FIG. 4, the control unit 110 also functions as a detection unit 111, a clipping unit 113, a targeted point estimation unit 115, a synthesis unit 117, and a display control unit 119.

The detection unit 111 detects a hand (an example of an object) from a captured image acquired by the sensor unit 120. An object detection method used by the detection unit 111 is not limited, and for example, an object detection method that is based on randomized decision forest (RDF) or the like may be used as being performed in Non-Patent Literature 1. A hand region detected by the detection unit 111 is provided to the clipping unit 113.

The clipping unit 113 clips the periphery of the hand from the captured image into a predetermined shape (e.g. rectangle) on the basis of the hand region detected by the detection unit 111, and resizes the clipped region into a predetermined size. Note that the clipping unit 113 may set values of regions in the clipped region that are other than the hand region to a predetermined value (e.g. 0). In addition, the clipping unit 113 may perform normalization processing of values. Because an image obtained by the clipping unit 113 is input to the targeted point estimation unit 115 as an input image, this configuration enhances processing accuracy of the targeted point estimation unit 115.

On the basis of the input image, the targeted point estimation unit 115 identifies probability maps indicating existence probabilities of a targeted point in a plurality of projection directions. For example, the targeted point estimation unit 115 may search the correspondence information database DB 20 stored in the storage unit 160, for an image similar to the input image (hereinafter, will be sometimes referred to as a similar image), and acquire, as probability maps to be identified, probability maps in a plurality of projection directions that are associated with the similar image obtained by the searching. Note that the similar image searching may be matching processing of extracting, as a similar image, an image having a small difference from the input image, from among images included in the correspondence information database DB 20, for example.

This configuration brings about such an effect that an input image is not limited to a depth image, and targeted point estimation processing to be performed by the targeted point estimation unit 115 can be executed using a variety of types of images as input images, if an image of a type similar to the input images is included in the correspondence information database DB 20.

In addition, the targeted point estimation unit 115 may extract a plurality of similar images from the correspondence information database DB 20 as similar images similar to one input image, and identify probability maps in the respective projection directions on the basis of a plurality of probability maps existing for the respective projection directions that are associated with the plurality of similar images. For example, the targeted point estimation unit 115 may acquire, as a probability map to be identified, a probability map obtained by adding up a plurality of probability maps and normalizing in such a manner that the total sum becomes a predetermined value (e.g. 1). This configuration can enhance the estimation accuracy of a targeted point position.

On the basis of the probability maps in the plurality of projection directions that have been identified by the targeted point estimation unit 115, the synthesis unit 117 identifies a three-dimensional position of the targeted point.

For example, the synthesis unit 117 may acquire a two-dimensional position having a maximum value, from a probability map in each projection direction, and identify a three-dimensional position of a targeted point on the basis of the two-dimensional position. For example, a case where two-dimensional positions (x1, y1) and (x2, z2) having the maximum values in the respective probability maps are acquired respectively from the probability map in the z direction and the probability map in the y direction will be considered.

In this case, the synthesis unit 117 may identify a three-dimensional position of a targeted point in such a manner that an average value of the two two-dimensional positions is used for a position in the x direction, and values of the respective two-dimensional positions are directly used for positions in the y direction and the z direction, for example. In other words, in the above-described example, the synthesis unit 117 may identify a three-dimensional position of a targeted point as ((x1+x2)/2, y1, z2).

Note that an identification method of a three-dimensional position that is used by the synthesis unit 117 is not limited to this example. For example, the synthesis unit 117 may preferentially use either of the two-dimensional positions for a position in the x direction. In addition, the synthesis unit 117 may backproject probability maps in a plurality of projection directions on a three-dimensional space and add up the probability maps, and identify, as a three-dimensional position of a targeted point, a position of a point at which a value (probability) is the highest in the three-dimensional space.

By identifying a three-dimensional position of a targeted point as described above, it is possible to identify a three-dimensional position of a targeted point without referring to a depth value of a depth image, and position estimation accuracy is less likely to deteriorate even in a case where the targeted point is hidden or in a case where the accuracy of the depth value is low.

The display control unit 119 controls display performed by the display unit 170. For example, the display control unit 119 may cause the display unit 170 to display an input image and a marker indicating a targeted point. In addition, the display control unit 119 may cause a marker indicating a targeted point, to be displayed in a size corresponding to a three-dimensional position of the targeted point.

Figure 5:
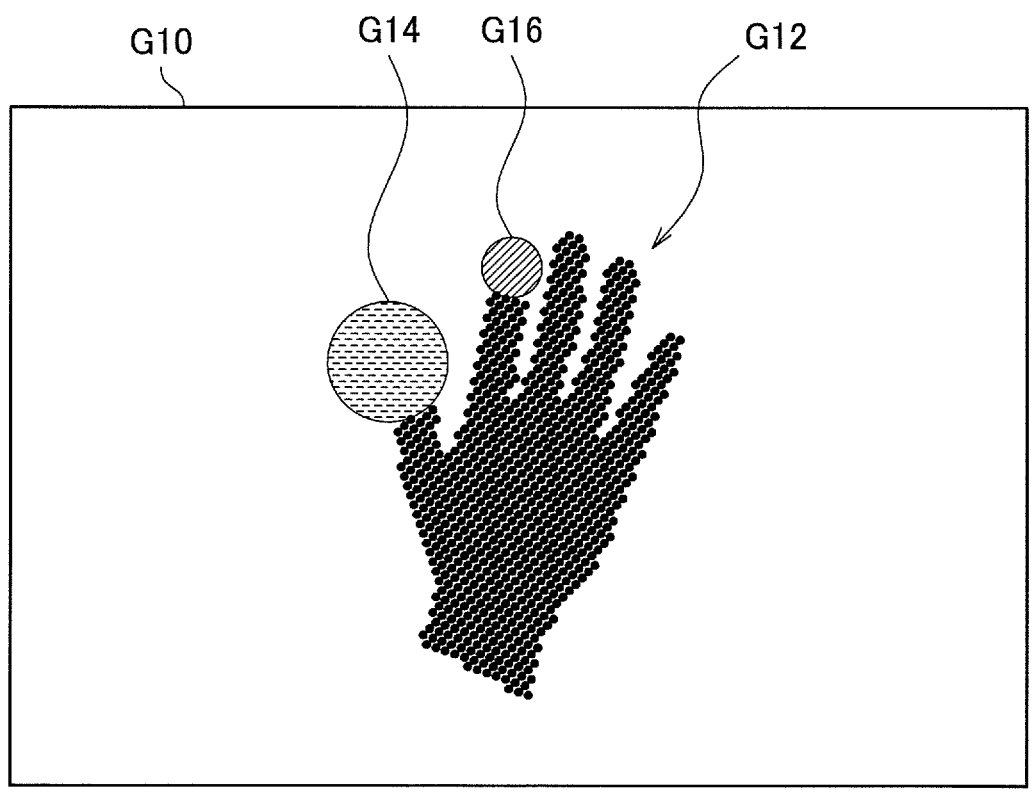
FIG. 5 is an explanatory diagram illustrating an example of a screen that a display control unit 119 according to the embodiment causes a display unit 170 to display.

FIG. 5 is an explanatory diagram illustrating an example of a screen that the display control unit 119 causes the display unit 170 to display. On a screen G10 illustrated in FIG. 5, markers G14 and G16 indicating targeted points are displayed together with an input image G12. In the example illustrated in FIG. 5, the markers indicating the targeted points are displayed in such a manner that their sizes become smaller as the targeted points get away in a rear direction (the z direction) of the screen G10 (position coordinates in the z direction become larger). This configuration enables a user to understand three-dimensional positions of the targeted points visually easily.

Note that display control performed by the display control unit 119 is not limited to this example. For example, the display control unit 119 may perform various types of screen display control using an identified three-dimensional position of a targeted point as a UI. In addition, the information processing apparatus 10 may have an output function other than display on the basis of a three-dimensional position of a targeted point.

4. OPERATION

Hereinbefore, the configuration example of the information processing apparatus 10 according to the present embodiment has been described. Subsequently, an operation example of the information processing apparatus 10 according to the present embodiment will be described with reference to FIG. 6.

Figure 6:
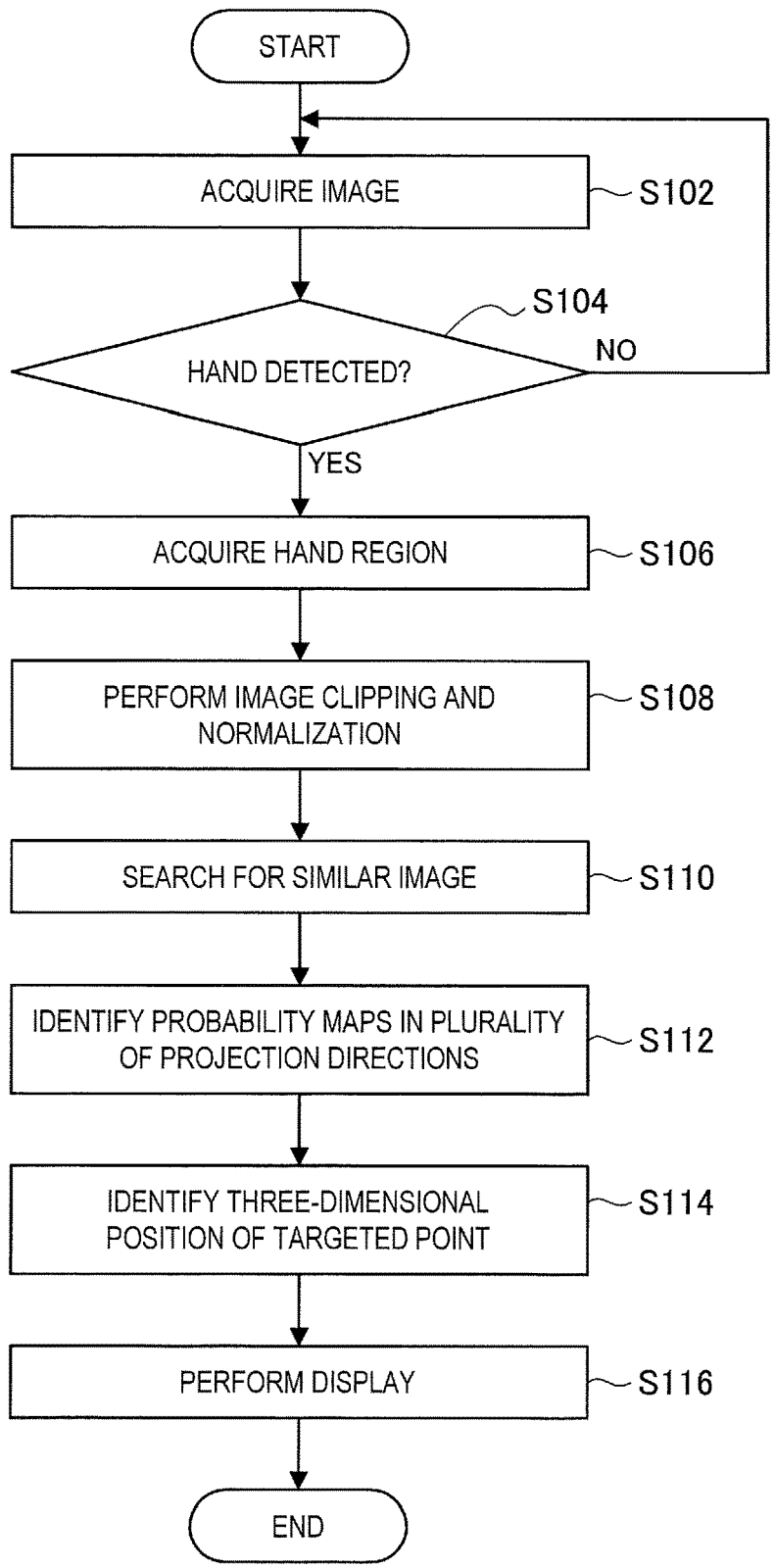
FIG. 6 is a flowchart diagram illustrating an operation example of an information processing apparatus 10 according to the embodiment.

FIG. 6 is a flowchart diagram illustrating an operation example of the information processing apparatus 10 according to the present embodiment. As illustrated in FIG. 6, First of all, the sensor unit 120 acquires a captured image by sensing (imaging) (S102). Subsequently, the detection unit 111 detects a hand from the captured image, and in a case where a hand is not detected from the captured image (NO in S104), the processing returns to step S102.

On the other hand, in a case where a hand has been detected from the captured image (YES in S104), a hand region is acquired by the detection unit (S106). Subsequently, image clipping and normalization are performed by the clipping unit 113, and an input image is obtained (S108).

The targeted point estimation unit 115 searches a correspondence information database for a similar image similar to the input image (S110). Furthermore, the targeted point estimation unit 115 identifies probability maps in a plurality of projection directions on the basis of probability maps associated with the similar image obtained by the searching (S112).

Subsequently, the synthesis unit 117 identifies a three-dimensional position of a targeted point on the basis of the probability maps in the plurality of projection directions that have been identified in step S112 (S114). Lastly, the display control unit 119 controls display performed by the display unit 170, on the basis of the three-dimensional position of the targeted point, and causes a marker indicating the targeted point, to be displayed, for example (S116).

Note that the above-described series of processes (S102 to S116) may be repeated as needed or at predetermined intervals.

5. MODIFIED EXAMPLES

Hereinbefore, the embodiment of the present disclosure has been described. Hereinafter, several modified examples of the embodiment of the present disclosure will be described. Note that the modified examples to be described below may be individually applied to the embodiment of the present disclosure, or may be applied to the embodiment of the present disclosure in combination. In addition, each modified example may be applied in place of a configuration described in the embodiment of the present disclosure, or may be applied in addition to a configuration described in the embodiment of the present disclosure.

5-1. Modified Example 1

In the above-described embodiment, the description has been given of an example in which the targeted point estimation unit 115 identifies probability maps on the basis of similar image searching, but the present technology is not limited to this example. Hereinafter, an example in which the targeted point estimation unit 115 identifies probability maps using a machine learning method will be described as Modified Example 1. A machine learning method to be used is not specifically limited, and a method that is based on a convolutional neural network (CNN) may be used, for example.

For example, the targeted point estimation unit 115 may identify probability maps in a plurality of projection directions by inputting an input image to a CNN (an example of a learning machine) obtained by learning in advance a learning image and probability maps in a plurality of projection directions that are associated with the learning image. The CNN obtained in the above-described manner can output probability maps in a plurality of projection directions that are to be identified, by inputting an input image.

Note that the learning image and the probability maps in the plurality of projection directions that are associated with the learning image may be similar to the image and the probability maps that are included in the correspondence information described with reference to FIG. 4. In addition, in this case, the storage unit 160 needs not store a correspondence information database. In addition, the storage unit 160 may store a learned CNN (an example of a learning machine). This configuration enables a size of data to be stored in the storage unit 160, to be reduced.

Figure 7:
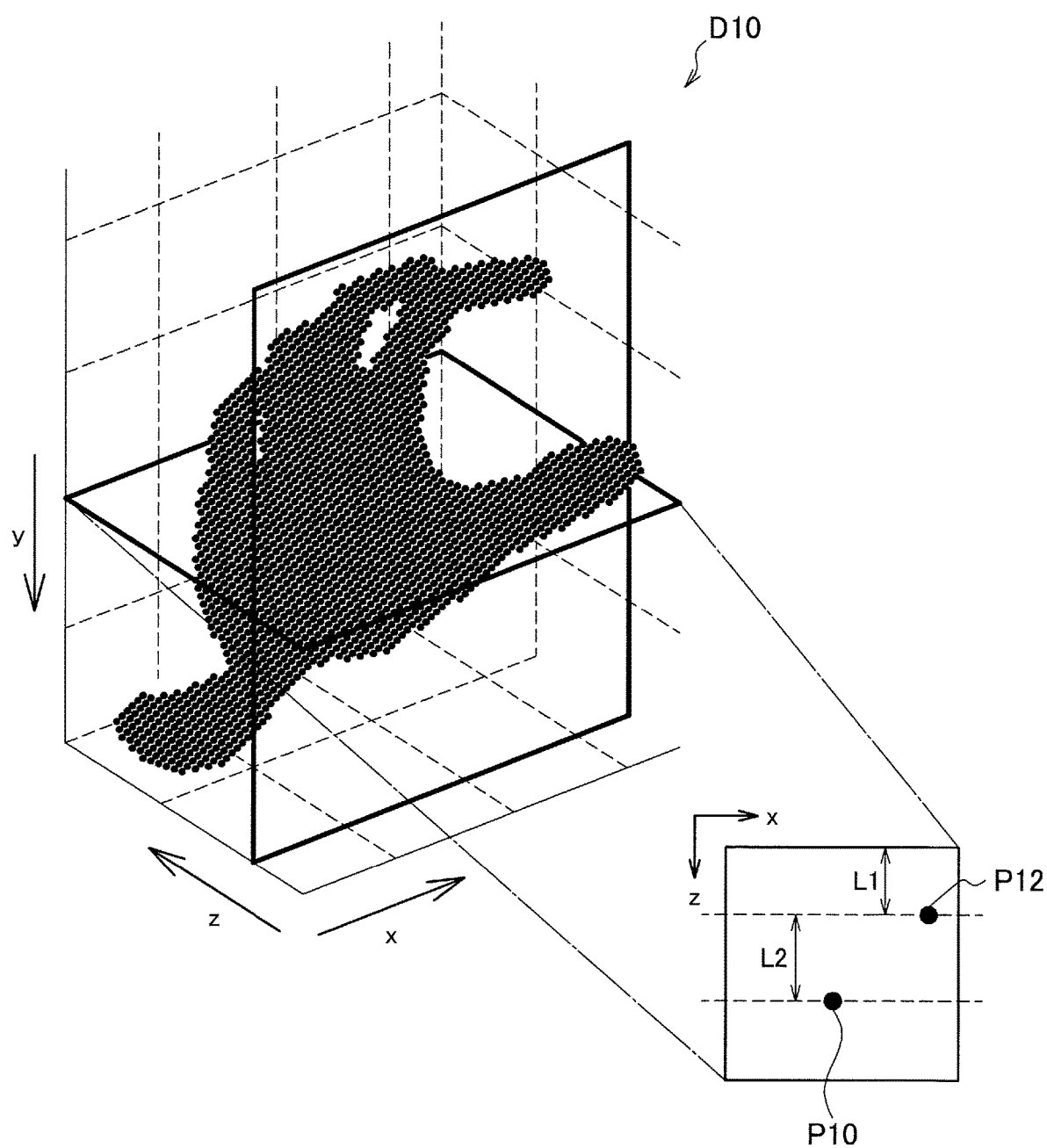
FIG. 7 is an explanatory diagram for describing a relative position in a probability map.

In addition, in a case where a probability map is identified using a machine learning method as described above, a probability map to be learned may be a probability map represented not by an absolute position but by a relative position. FIG. 7 is an explanatory diagram for describing a relative position in a probability map.

A point P10 illustrated in FIG. 7 is a position on the x-z plane of a palm center (a centroid of a point group belonging to a hand region) that is identified from a depth image D10. Here, as illustrated in FIG. 7, an absolute position in the z direction of a targeted point P12 on the x-z plane can be represented by a distance L1 from an end of a normalized range. On the other hand, a relative position in the z direction of the targeted point P12 can be represented by a distance L2 in the z direction from the point P10.

By the above-described probability map represented by a relative position, being used for learning, in a case where a relationship between targeted points can be easily obtained (e.g. in a case where an input image is an image other than a depth image), the targeted point estimation unit 115 can identify a more appropriate probability map.

5-2. Modified Example 2

In the above-described embodiment, an example in which an input image is a depth image has been described, but the present technology is not limited to this example. Hereinafter, an example of a case where an input image is a polarization image including polarization information will be described as Modified Example 2.

Figure 8:
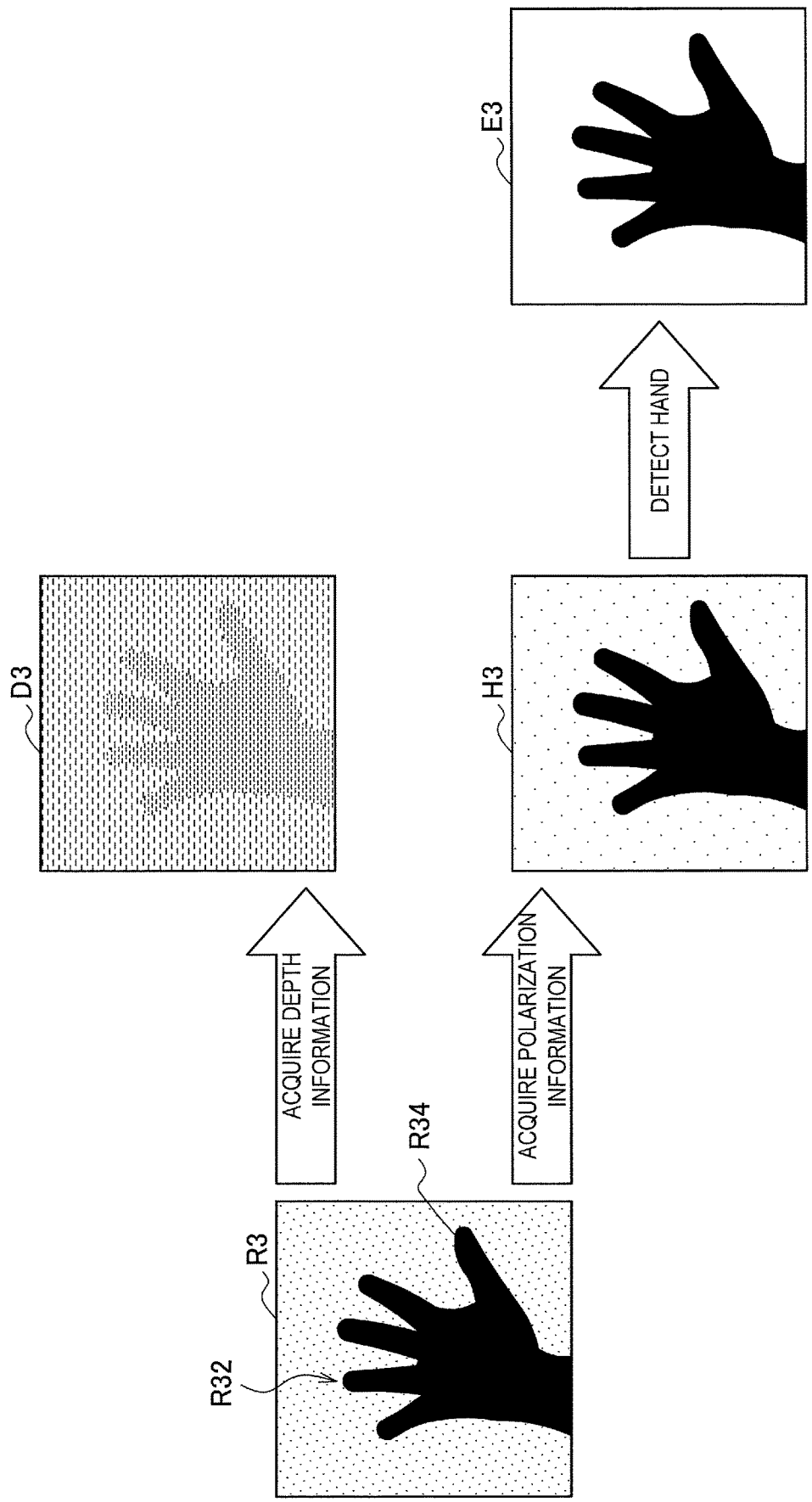
FIG. 8 is an explanatory diagram for describing an advantage obtained in a case where a polarization image is used as an input image.

FIG. 8 is an explanatory diagram for describing an advantage obtained in a case where a polarization image is used as an input image. A real space R3 illustrated in FIG. 8 represents a state in which a hand R34 is in contact with a table R32. In such a situation, in a depth image D3 obtained by acquiring depth information, a difference between a depth value of a hand region and a depth value of a table region is small. Thus, in a case where hand detection is performed using such a depth image D3 as an input image, there is a possibility that accuracy deteriorates.

On the other hand, because polarization information varies depending on the material of a subject, for example, in a polarization image H3 obtained by acquiring polarization information, a difference in value between the hand region and the table region becomes clear. Thus, when hand detection is performed using a polarization image as an input image, it becomes possible to accurately detect a hand region as in a hand detection result E3, and as a result, the estimation accuracy of a targeted point position can also be enhanced.

Figure 9:
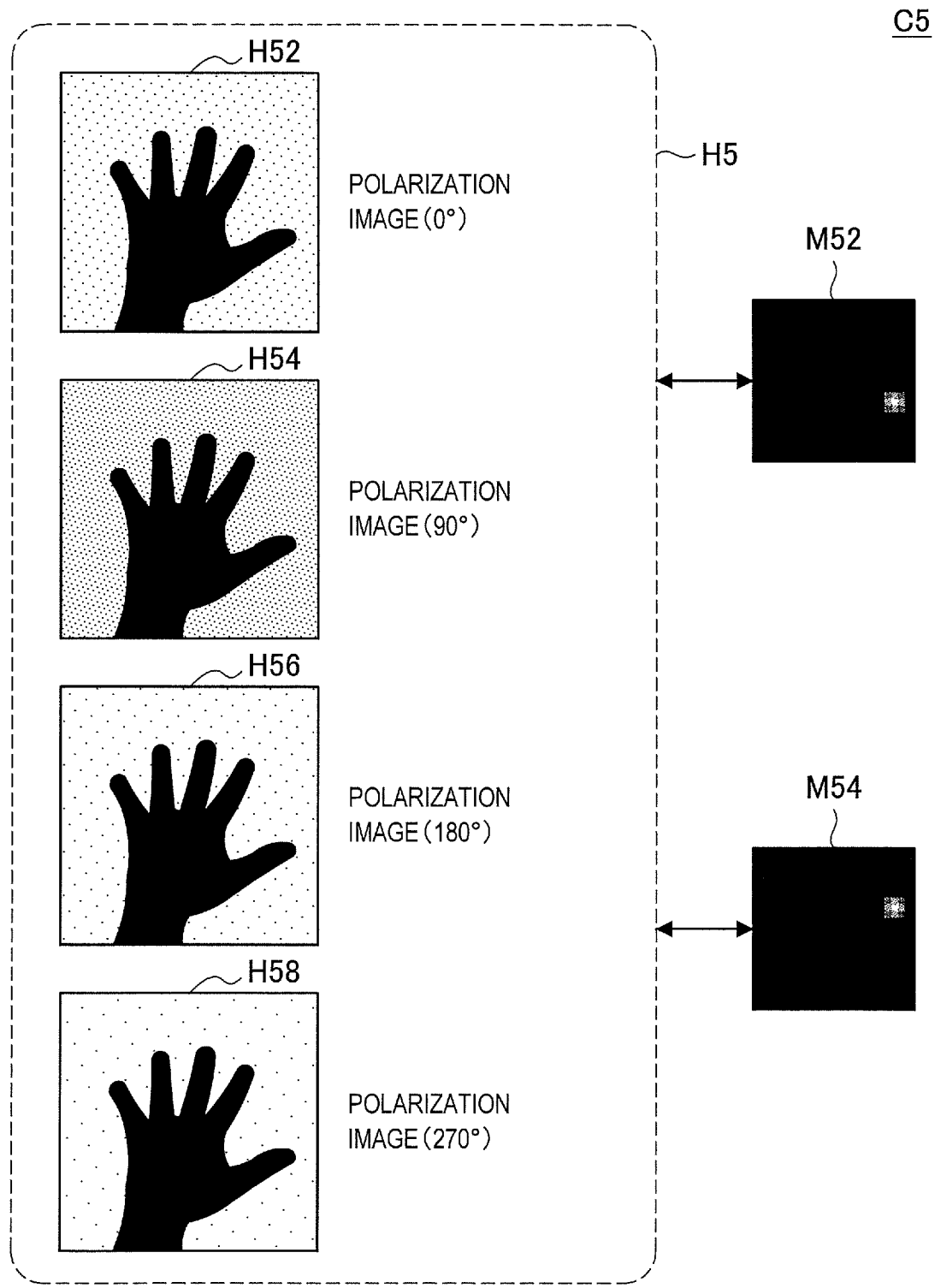
FIG. 9 is an explanatory diagram illustrating an example of correspondence information according to Modified Example 2.

In a case where a polarization image is used as an input image, a correspondence information database to be stored in the storage unit 160 may store, as correspondence information, a polarization image and a probability map associated with the polarization image. In addition, the correspondence information may include polarization images in a plurality of polarization directions. FIG. 9 is an explanatory diagram illustrating an example of correspondence information according to this modified example.

As illustrated in FIG. 9, correspondence information C5 to be stored in a correspondence information database in this modified example includes an image (group) H5 including polarization images H52 to H58 in four polarization directions of 0°, 90°, 180°, and 270°. In addition, the correspondence information C5 further includes probability maps M52 and M54 in a plurality of projection directions that are associated with the image (group) H5.

In this case, an input image may also include polarization images in a plurality of polarization directions, and the targeted point estimation unit 115 may calculate, for each polarization direction, a difference between the input image and an image included in the correspondence information database, and extract an image (group) in which the total of differences becomes small, as a similar image. This configuration enables a similar image to be identified more accurately, and as a result, the position estimation accuracy of a targeted point can also be enhanced.

5-3. Modified Example 3

Hereinafter, an example of a case where an input image is a normal line image including normal line information will be described as Modified Example 3. The normal line image may be generated from a depth image, for example, but it is desirable that the normal line image is generated from a polarization image because resolution is more likely to be higher when the normal line image is generated from a polarization image.

FIG. 10 is an explanatory diagram for describing a normal line image. From a normal line image H1, for example, information regarding normal line directions (arrows in the drawing) can be acquired, and the shape of an object (e.g. the shape of roundness of a finger) can be recognized. In addition, as illustrated in FIG. 10, the normal line image H1 can be represented with being separated into an x direction component, a y direction component, and a z direction component, for example. Note that the normal line image H1 may be represented as one RGB image (color image) in which the x direction, the y direction, and the z direction of normal components are set to values of respective channels of R (red), G (green), and B (blue), for example.

In the example illustrated in FIG. 10, it can be seen that, in a portion Y10 of an image obtained by resolving the normal line image in the y direction component, because a value is relatively large in a region Y12, a normal line has a strong component in an upper direction (y-axis positive direction), and because a value is relatively large in a region Y14, the normal line has a strong component in a lower direction (y-axis negative direction).

Note that the representation method of normal components is not limited to a method of representing normal components in the x direction, the y direction, and the z direction. For example, normal components can also be represented by a zenithal angle or an azimuth angle.

Figure 11:
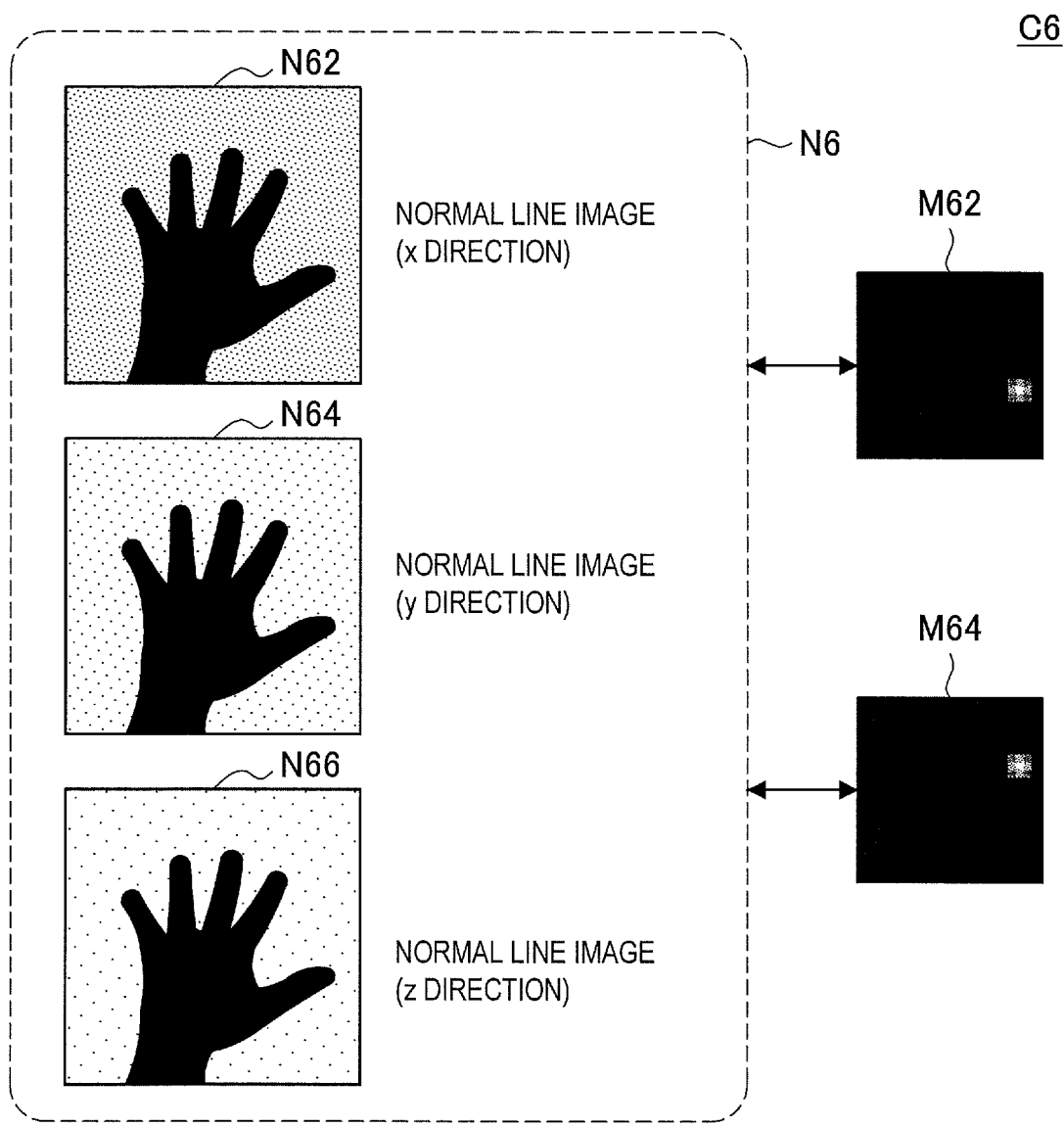
FIG. 11 is an explanatory diagram illustrating an example of correspondence information according to Modified Example 3.

In a case where a normal line image is used as an input image, a correspondence information database to be stored in the storage unit 160 may store, as correspondence information, a normal line image and a probability map associated with the normal line image. In addition, the correspondence information may include normal line images that represent a plurality of normal components. FIG. 11 is an explanatory diagram illustrating an example of correspondence information according to this modified example.

As illustrated in FIG. 11, correspondence information C6 to be stored in a correspondence information database in this modified example includes an image (group) N6 including normal line images N62 to N66 that respectively represent normal components in three directions of the x direction, the y direction, and the z direction. In addition, the correspondence information C6 further includes probability maps M62 and M64 in a plurality of projection directions that are associated with the image (group) N6.

In this case, an input image may also similarly include normal line images that respectively represent normal components in the three directions of the x direction, the y direction, and the z direction, and the targeted point estimation unit 115 may calculate, for each direction, a difference between the input image and an image included in the correspondence information database, and extract an image (group) in which the total of differences becomes small, as a similar image.

5-4. Modified Example 4

In the above-described embodiment and modified examples, the description has been given of an example in which the types of images included in an input image (RGB image, depth image, polarization image, normal line image, etc.) are the same, but the present technology is not limited to this example. Hereinafter, an example in which an input image includes a plurality of types of images will be described as Modified Example 4.

In addition, in a case where an input image includes a plurality of types of images, a correspondence information database to be stored in the storage unit 160 may store correspondence information including images of types corresponding to the input image.

Figure 12:
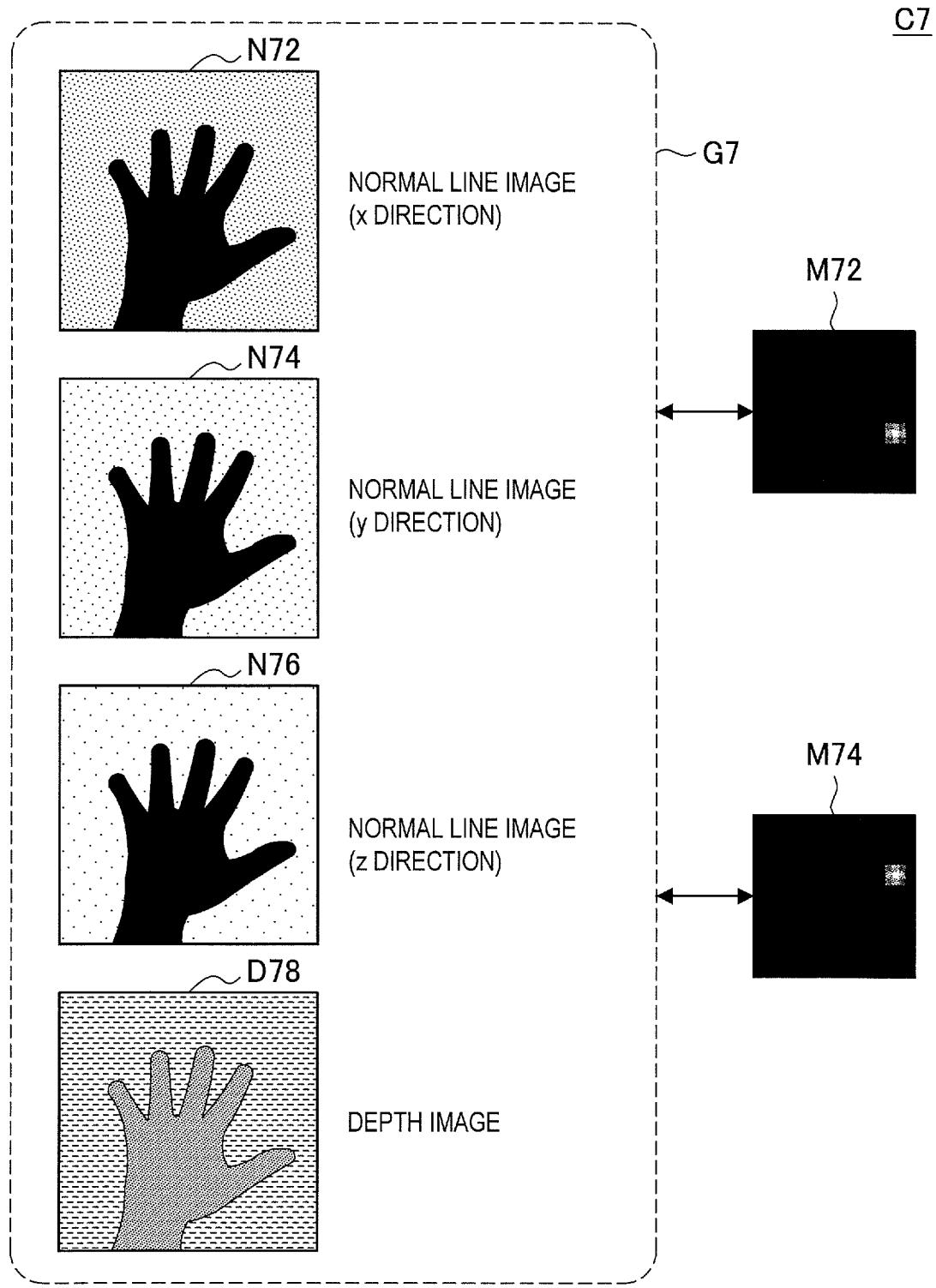
FIG. 12 is an explanatory diagram illustrating an example of correspondence information in a case where an input image includes a normal line image and a depth image.

FIG. 12 is an explanatory diagram illustrating an example of correspondence information in a case where an input image includes a normal line image and a depth image. As illustrated in FIG. 12, correspondence information C7 to be stored in a correspondence information database in this case includes an image (group) G7 including normal line images N72 to N76 that respectively represent normal components in three directions, and a depth image D78. In addition, the correspondence information C7 further includes probability maps M72 and M74 in a plurality of projection directions that are associated with the image (group) G7.

Figure 13:
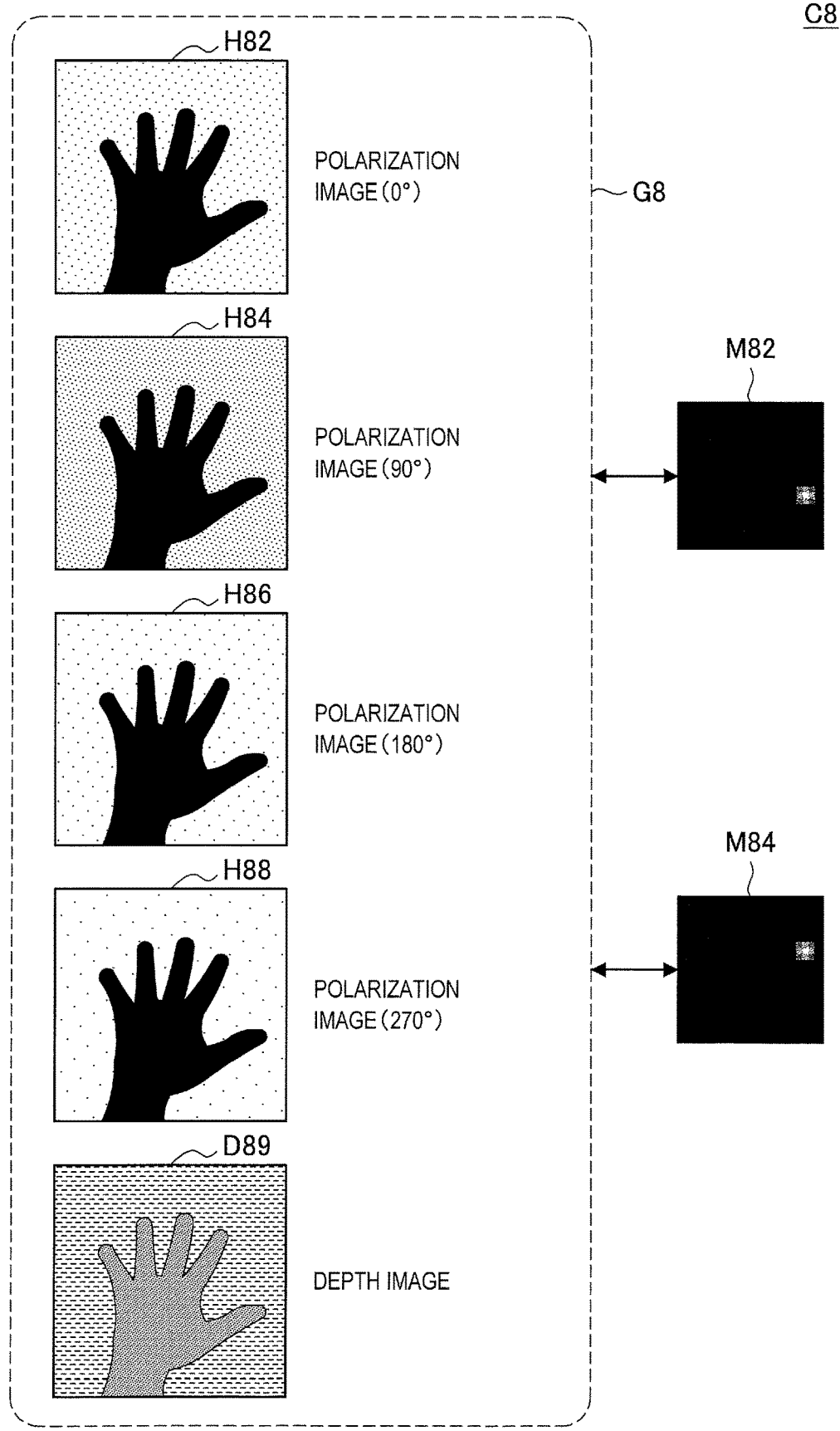
FIG. 13 is an explanatory diagram illustrating an example of correspondence information in a case where an input image includes a polarization image and a depth image.

In addition, FIG. 13 is an explanatory diagram illustrating an example of correspondence information in a case where an input image includes a polarization image and a depth image. As illustrated in FIG. 13, correspondence information C8 to be stored in a correspondence information database in this case includes an image (group) G8 including polarization images H82 to H88 in four polarization directions, and a depth image D89. In addition, the correspondence information C8 further includes probability maps M82 and M84 in a plurality of projection directions that are associated with the image (group) G8.

In the above-described cases, the targeted point estimation unit 115 may calculate, for each image type and for each direction, a difference between the input image and an image included in the correspondence information database, and extract an image (group) in which the total of differences becomes small, as a similar image. This configuration enables a similar image to be identified more accurately, and as a result, the position estimation accuracy of a targeted point can also be enhanced.

In addition, a plurality of types of images included in an input image may be used for different purposes. FIG. 14 is an explanatory diagram illustrating an example of targeted point estimation processing performed in a case where an input image includes a depth image and a polarization image. A real space R9 illustrated in FIG. 14 represents a state in which a pen R94 (an example of an object other than a hand) exists on a hand R92 (an example of an object having a targeted point). In a probability map A9 obtained by performing targeted point estimation using depth information acquired in such a situation (on the basis of a depth image), aside from a region A92 corresponding to the targeted point (fingertip), a large value (existence probability) sometimes occurs also in a region A94 corresponding to the tip of the pen. When the probability map A9 is directly input to the synthesis unit 117 and a three-dimensional position is identified, there is a possibility that an erroneous three-dimensional position is identified.

Here, as illustrated in FIG. 14, in a detection result E9 obtained by performing hand detection using polarization information (on the basis of a polarization image), a hand region E92 excluding the region of the pen is obtained. Note that the detection result E9 may be represented in a binary form as illustrated in FIG. 14, or may be represented as a map indicating an existence probability of a hand. The targeted point estimation unit 115 can identify, a probability map K9 having a large value only in a region K92 corresponding to the targeted point (fingertip), by overlapping the probability map A9 and the detection result E9. Note that, in FIG. 14, the description has been given of an example in which hand detection is performed on the basis of a polarization image, but a normal line image may be used in place of a polarization image.

This configuration enhances the estimation accuracy of a targeted point position.

6. HARDWARE CONFIGURATION EXAMPLE

The embodiment of the present disclosure has been described hitherto. Finally, a hardware configuration of an information processing apparatus according to the present embodiment will be described with reference to FIG. 15. FIG. 15 is a block diagram illustrating an example of the hardware configuration of the information processing apparatus according to the present embodiment. Meanwhile, an information processing apparatus 900 illustrated in FIG. 15 may realize the information processing apparatus 10 illustrated in FIG. 4, for example. Information processing by the information processing apparatus 10 according to the present embodiment is realized according to cooperation between software and hardware described below.

As illustrated in FIG. 15, the information processing apparatus 900 includes a central processing unit (CPU) 901, a read only memory (ROM) 902, a random access memory (RAM) 903, and a host bus 904a. In addition, the information processing apparatus 900 includes a bridge 904, an external bus 904b, an interface 905, an input device 906, an output device 907, a storage device 908, a drive 909, a connection port 911, a communication device 913, and a sensor 915. The information processing apparatus 900 may include a processing circuit such as a DSP or an ASIC instead of the CPU 901 or along therewith.

The CPU 901 functions as an arithmetic processing device and a control device and controls the overall operation in the information processing apparatus 900 according to various programs. Further, the CPU 901 may be a microprocessor. The ROM 902 stores programs, operation parameters, and the like used by the CPU 901. The RAM 903 temporarily stores programs used in execution of the CPU 901, parameters appropriately changed in the execution, and the like. The CPU 901 may form the control unit 110, for example.

The CPU 901, the ROM 902, and the RAM 903 are connected by the host bus 904a including a CPU bus and the like. The host bus 904a is connected with the external bus 904b such as a peripheral component interconnect/interface (PCI) bus via the bridge 904. Further, the host bus 904a, the bridge 904, and the external bus 904b are not necessarily separately configured and such functions may be mounted in a single bus.

The input device 906 is realized by a device through which a user inputs information, such as a mouse, a keyboard, a touch panel, a button, a microphone, a switch, and a lever, for example. In addition, the input device 906 may be a remote control device using infrared ray or other electric waves, or external connection equipment such as a cellular phone or a PDA corresponding to an operation of the information processing apparatus 900, for example. Furthermore, the input device 906 may include an input control circuit or the like which generates an input signal on the basis of information input by the user using the aforementioned input means and outputs the input signal to the CPU 901, for example. The user of the information processing apparatus 900 may input various types of data or order a processing operation for the information processing apparatus 900 by operating the input device 906.

The output device 907 is formed by a device that may visually or aurally notify the user of acquired information. As such devices, there are a display device such as a CRT display device, a liquid crystal display device, a plasma display device, an EL display device, or a lamp, a sound output device such as a speaker and a headphone, a printer device, and the like. The output device 907 outputs results acquired through various processes performed by the information processing apparatus 900, for example. Specifically, the display device visually displays results acquired through various processes performed by the information processing apparatus 900 in various forms such as text, images, tables, and graphs. On the other hand, the sound output device converts audio signals including reproduced sound data, audio data, and the like into analog signals and aurally outputs the analog signals. The output device 907 may form the display unit 170, for example.

The storage device 908 is a device for data storage, formed as an example of a storage unit of the information processing apparatus 900. For example, the storage device 908 is realized by a magnetic storage device such as an HDD, a semiconductor storage device, an optical storage device, a magneto-optical storage device, or the like. The storage device 908 may include a storage medium, a recording device for recording data on the storage medium, a reading device for reading data from the storage medium, a deletion device for deleting data recorded on the storage medium, and the like. The storage device 908 stores programs and various types of data executed by the CPU 901, various types of data acquired from the outside, and the like. The storage device 908 may form the storage unit 160, for example.

The drive 909 is a reader/writer for storage media and is included in or externally attached to the information processing apparatus 900. The drive 909 reads information recorded on a removable storage medium such as a magnetic disc, an optical disc, a magneto-optical disc, or a semiconductor memory mounted thereon, and outputs the information to the RAM 903. In addition, the drive 909 may write information regarding the removable storage medium.

The connection port 911 is an interface connected with external equipment and is a connector to the external equipment through which data may be transmitted through a universal serial bus (USB) and the like, for example.

The communication device 913 is a communication interface formed by a communication device for connection to a network 920 or the like, for example. The communication device 913 is a communication card or the like for a wired or wireless local area network (LAN), long term evolution (LTE), Bluetooth (registered trademark), or wireless USB (WUSB), for example. In addition, the communication device 913 may be a router for optical communication, a router for asymmetric digital subscriber line (ADSL), various communication modems, or the like. For example, the communication device 913 may transmit/receive signals and the like to/from the Internet and other communication apparatuses according to a predetermined protocol such as, for example, TCP/IP.

The sensor 915 corresponds to various types of sensors such as an acceleration sensor, a gyro sensor, a geomagnetic sensor, a light sensor, a sound sensor, a distance measuring sensor, and a force sensor, for example. The sensor 915 acquires information regarding a state of the information processing apparatus 900 itself, such as an attitude and a movement speed of the information processing apparatus 900), and information regarding a surrounding environment of the information processing apparatus 900, such as brightness and noise of the periphery of the information processing apparatus 900. In addition, the sensor 915 may include a GPS sensor that receives a GPS signal, and measures latitude, longitude, and altitude of the device. The sensor 915 may form, for example, the sensor unit 120.

Further, the network 920 is a wired or wireless transmission path of information transmitted from devices connected to the network 920. For example, the network 920 may include a public circuit network such as the Internet, a telephone circuit network, or a satellite communication network, various local area networks (LANs) including Ethernet (registered trademark), a wide area network (WAN), and the like. In addition, the network 920 may include a dedicated circuit network such as an internet protocol-virtual private network (IP-VPN).

Hereinbefore, an example of a hardware configuration capable of realizing the functions of the information processing apparatus 900 according to this embodiment is shown. The respective components may be implemented using universal members, or may be implemented by hardware specific to the functions of the respective components. Accordingly, according to a technical level at the time when the embodiments are executed, it is possible to appropriately change hardware configurations to be used.

In addition, a computer program for realizing each of the functions of the information processing apparatus 900 according to the present embodiment as described above may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. Further, the computer program may be delivered through a network, for example, without using the recording medium. In addition, the above-described computer program may be distributed through, for example, a network without using a recording medium.

7. CONCLUSION

As described above, according to the embodiment of the present disclosure, because the influences of a hidden targeted point and the accuracy of a depth value are less likely to be received, it is possible to estimate a three-dimensional position of a targeted point more accurately. In addition, it is possible to use an image other than a depth image as an input image, and the present disclosure can be used in a wider variety of purposes and configurations. In addition, because a three-dimensional position is identified after a plurality of two-dimensional probability maps are identified, a calculation amount can be suppressed more than a case where a three-dimensional position is directly obtained.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above-described embodiment, the description has been given of an example in which the targeted point estimation unit 115 identifies probability maps in two directions, but the present technology is not limited to this example. The targeted point estimation unit 115 may identify probability maps in three directions, and in this case, correspondence information stored in a correspondence information database stored in the storage unit 160 may include probability maps in three directions. In addition, in this case, the synthesis unit 117 may identify a three-dimensional position on the basis of the probability maps in the three directions.

In addition, in a case where an input image includes a depth image, and it can be determined that a depth value is accurate, or a targeted point is not hidden, a three-dimensional position of the targeted point may be identified by referring to a depth value of a two-dimensional position that is obtained on the basis of a probability map in one direction.

In addition, the above description has been given of an example of identifying a targeted point position of a hand, but an object according to the present technology is not limited to a hand, and may be a human body, a face, an automobile, or the like, for example. In addition, an identified targeted point position can be applied in various manners aside from display.

The targeted point position of the hand is considered to be applied to a UI that is based on a shape of the hand and the targeted point position, intention understanding of a user, or the like, for example, and the targeted point position of the human body is considered to be applied to a UI that is based on a shape of the human body and the targeted point position, a game manipulation, or the like, for example. In addition, the targeted point position of the automobile is considered to be applied to processing of sterically recognizing a situation of another automobile, or the like in driving assist or an automated driving function.

In addition, in Modified Examples 2 to 4 described above, the description has been given of an example in which a plurality of images is included in an input image, but an input image may be images all obtained on the basis of sensing (imaging) from one direction (the same direction). According to the above-described embodiment of the present technology, it is possible to identify a three-dimensional position without using input images sensed from a plurality of directions, and cost incurred in sensing can be suppressed.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:
a targeted point estimation unit configured to identify probability maps indicating existence probabilities of a targeted point in a plurality of projection directions, on the basis of an input image; and
a synthesis unit configured to identify a three-dimensional position of the targeted point on the basis of the probability maps in the plurality of projection directions.

(2)

The information processing apparatus according to (1), in which the targeted point estimation unit identifies the probability maps on the basis of probability maps associated with a similar image similar to the input image.

(3)

The information processing apparatus according to (2), in which the targeted point estimation unit identifies the probability maps on the basis of the probability maps associated with a plurality of the similar images.

(4)

The information processing apparatus according to (1), in which the targeted point estimation unit identifies the probability maps by inputting the input image to a learning machine obtained by learning a learning image and probability maps in a plurality of projection directions that are associated with the learning image.

(5)

The information processing apparatus according to any one of (1) to (4), in which the synthesis unit acquires a two-dimensional position having a maximum value, from the probability map in each projection direction, and identifies the three-dimensional position of the targeted point on the basis of the two-dimensional position.

(6)

The information processing apparatus according to any one of (1) to (5), in which the input image includes at least either one of a polarization image or a normal line image.

(7)

The information processing apparatus according to (6), in which the input image includes polarization images in a plurality of polarization directions.

(8)

The information processing apparatus according to (6) or (7), in which the targeted point is a point included in an object included in the input image,
the input image further includes a depth image, and
the targeted point estimation unit identifies the probability map on the basis of a probability map obtained on the basis of the depth image, and a detection result of the object that is based on the polarization image or the normal line image.

(9)

The information processing apparatus according to any one of (1) to (8), in which the input image is an image obtained on the basis of sensing from one direction.

(10)

The information processing apparatus according to any one of (1) to (9), further including:
a display control unit configured to cause a marker indicating the targeted point, to be displayed in a size corresponding to the three-dimensional position of the targeted point.

(11)

An information processing method including:
identifying probability maps indicating existence probabilities of a targeted point in a plurality of projection directions, on the basis of an input image; and identifying, by a processor, a three-dimensional position of the targeted point on the basis of the probability maps in the plurality of projection directions.

(12)

A computer-readable recording medium having a program recorded therein, the program causing a computer to execute:

a function of identifying probability maps indicating existence probabilities of a targeted point in a plurality of projection directions, on the basis of an input image; and a function of identifying a three-dimensional position of the targeted point on the basis of the probability maps in the plurality of projection directions.

REFERENCE SIGNS LIST 10 information processing apparatus
110 control unit
111 detection unit
113 clipping unit
115 targeted point estimation unit
117 synthesis unit
117 synthesis unit
119 display control unit
120 sensor unit
160 storage unit
170 display unit

The invention claimed is:

1. An information processing apparatus comprising:
a targeted point estimation unit configured to identify two-dimensional probability maps indicating existence probabilities of at least one targeted point included in a target object in a plurality of projection directions by using a neural network obtained in advance from learning single two-dimensional images that are stored in association with each other and their respective associated two-dimensional probability maps of the at least one targeted point in the plurality of projection directions that are stored in association with each other; and
a synthesis unit configured to identify a three-dimensional position of the targeted point on a basis of the associated two-dimensional probability maps in the plurality of projection directions in order to output a three-dimensional position estimation of the targeted point based on a two-dimensional input image in one of the plurality of projection directions,
wherein the identified two-dimensional probability maps represent a relative position of the at least one targeted point, and
wherein the targeted point estimation unit and the synthesis unit are each implemented via at least one processor.

2. The information processing apparatus according to claim 1, wherein the targeted point estimation unit identifies the two-dimensional probability maps on a basis of probability maps associated with at least one of the two-dimensional learning images similar to the two-dimensional input image.

3. The information processing apparatus according to claim 1, wherein the synthesis unit acquires a two-dimensional position having a maximum value, from the two-dimensional probability map in each projection direction, and identifies the three-dimensional position of the targeted point on a basis of the two-dimensional position in each projection direction.

4. The information processing apparatus according to claim 1, wherein the two-dimensional input image includes at least one of a polarization image or a normal line image.

5. The information processing apparatus according to claim 4, wherein the two-dimensional input image includes polarization images in a plurality of polarization directions.

6. The information processing apparatus according to claim 4,
wherein the two-dimensional input image further includes a depth image, and
wherein the targeted point estimation unit identifies each two-dimensional probability map on a basis of the depth image and a detection result of the target object that is based on the at least one of the polarization image or the normal line image.

7. The information processing apparatus according to claim 1, further comprising:
a display control unit configured to cause a marker indicating the targeted point to be displayed in a size corresponding to the three-dimensional position of the targeted point,
wherein the display control unit is implemented via at least one processor.

8. The information processing apparatus according to claim 1,
wherein the at least one targeted point includes a plurality of targeted points, and
wherein the identified two-dimensional probability maps represent relative positions of the plurality of targeted points.

9. The information processing apparatus according to claim 1, wherein the identified two-dimensional probability maps represent the relative position of the at least one targeted point with respect to an absolute position of another point included in the target object.

10. An information processing method comprising:
identifying two-dimensional probability maps indicating existence probabilities of at least one targeted point included in a target object in a plurality of projection directions by using a neural network obtained in advance from learning single two-dimensional images that are stored in association with each other and their respective associated two-dimensional probability maps of the at least one targeted point in the plurality of projection directions that are stored in association with each other; and
identifying, by a processor, a three-dimensional position of the targeted point on a basis of the associated two-dimensional probability maps in the plurality of projection directions in order to output a three-dimensional position estimation of the targeted point based on a two-dimensional input image in one of the plurality of projection directions,
wherein the identified two-dimensional probability maps represent a relative position of the at least one targeted point.

11. A non-transitory computer-readable recording medium having embodied thereon a program, which when executed by a computer causes the computer to execute a method, the method comprising:
identifying two-dimensional probability maps indicating existence probabilities of at least one targeted point included in a target object in a plurality of projection directions by using a neural network obtained in advance from learning single two-dimensional images that are stored in association with each other and their respective associated two-dimensional probability maps of the at least one targeted point in the plurality of projection directions that are stored in association with each other; and identifying a three-dimensional position of the targeted point on a basis of the associated two-dimensional probability maps in the plurality of projection directions in order to output a three-dimensional position estimation of the targeted point based on a two-dimensional input image in one of the plurality of projection directions, wherein the identified two-dimensional probability maps represent a relative position of the at least one targeted point.

* * * * *